Feb. 28, 1950    H. J. COLES    2,499,131
LIVE CENTER FOR LATHES, ETC.
Filed Dec. 28, 1945

INVENTOR.
Harold J. Coles
BY
Milburn Milburn
ATTORNEYS

Patented Feb. 28, 1950

2,499,131

UNITED STATES PATENT OFFICE 2,499,131

LIVE CENTER FOR LATHES, ETC.

Harold J. Coles, Cleveland, Ohio, assignor, by mesne assignments, to Elmer G. Davis, Cleveland, Ohio Application December 28, 1945, Serial No. 637,510

1 Claim. (Cl. 308—176)

This invention relates to improvements in an attachment that is known in the trade as a "live center" and that is adapted to be applied to the tail stock of a lathe, for instance. Such attachments are now in use for the purpose of supporting the work in a rotatable manner so as to avoid friction, heat and wear at the point of support.

The object of my present invention is to devise such an attachment with an improved means for compensating automatically for the longitudinal or axial thrust between the parts of the attachment.

Other objects will appear from the following description and claim when considered together with the accompanying drawing.

Figure 1:
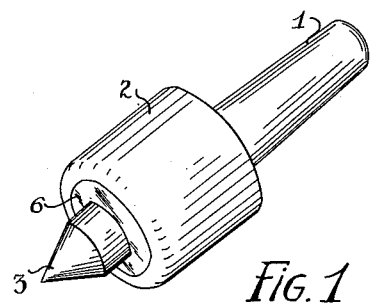
Fig. 1 is a perspective view of an attachment embodying my present invention.
Figure 2:
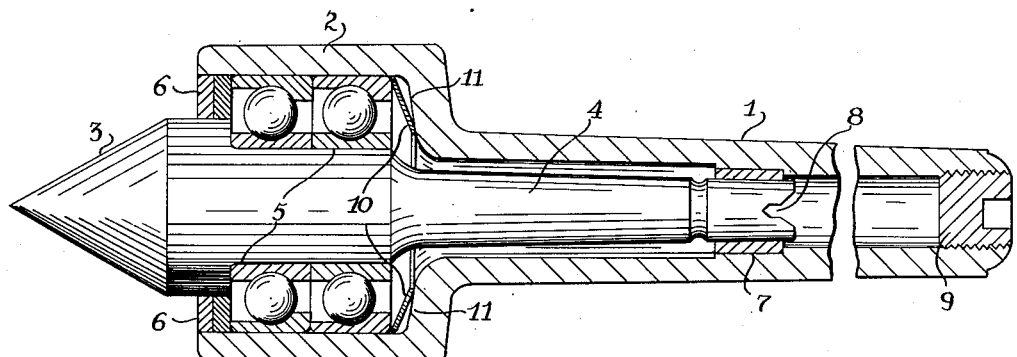
Fig. 2 is a longitudinal sectional view thereof.
Figure 3:
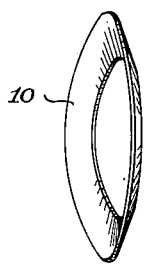
Fig. 3 is a perspective view of a novel part of my present device.

It is to be understood that the present form of disclosure is merely for the purpose of illustration and that there might be devised various modifications thereof without departing from the spirit of my invention as herein set forth and claimed.

Referring to the present accompanying drawing, the outer member has a hollow, tapered shank portion 1 that is adapted to be inserted and engaged by a drive fit within the tail stock of a lathe, for instance, and it has the enlarged housing 2 at the forward end thereof. Within the outer member there is rotatably mounted the head member which has a conical-shaped forward end portion 3 for engagement with the work, and which has a stem 4 extending rearwardly within the shank portion 1. The forward end portion 3 of the head member has a double ball bearing supporting engagement 5 within the housing portion 2. The forward end of the housing portion 2 is closed by the annular members 6. The rear end of the stem 4 has a compensating bearing 7 within the hollow shank portion 1, and its extreme rear end has the slot 8 for engagement by a tool for removing the inner member after first removing the screw plug 9 from the rear end of the shank portion 1.

Between the rear surface of the ball bearing means 5 and the adjacent inner surface of the rear wall of the housing 2, I have provided the cupped form of resilient metal ring member 10 which, in the present illustration, has its surface inclined outwardly and forwardly. As will be understood, the force of longitudinal thrust will tend to cause this cupped form of ring member 10 to assume flat form; and, in order to prevent such ring member from being flattened to the point of dead center or beyond such point, I have inclined the inner surface 11 of the rear wall of the housing 2 forwardly and outwardly to sufficient degree, an inclination of approximately five (5) degrees having been found to be satisfactory for this purpose. However, my invention is not limited to any particular angle of inclination.

There will be suitable clearance provided between the outer edge of the ring member 10 and the inner surface of the side wall of the housing so as to permit movement of the ring member 10 in the manner herein contemplated.

With my present invention, there is always ensured an automatically compensating means for the longitudinal thrust; and, moreover, my particular arrangement is always dependable. Also, my form of device for this purpose is comparatively inexpensive and it is easily installed and is calculated to last indefinitely. As clearly indicated in the present drawing, the resilient member 10 is of plain, cupped form and can be manufactured in a comparatively simple manner. Also, this form of resilient member 10 will function in a most efficient manner. My present improvement increases the value of a "live center" because of the manner in which it reduces the danger of friction and over-heating, friction being thereby reduced to a minimum and over-heating being avoided entirely. My improved device will rotate with the work in a most efficient manner and it will not burn out the center of the work no matter how long the run is continued without interruption, and it is especially valuable for use by unskilled labor.

Other advantages of my present invention will readily suggest themselves to those who are familiar with the art to which this invention relates.

What I claim is:

In a device of the class described, the combination of a plain cupped annular resilient element, a wall against which said resilient element is supported at one side thereof, and a bearing means adapted for engagement with the opposite side of said resilient element, said resilient element when in idle condition being fully cupped and having only its inner marginal portion in engagement with said wall and only its outer marginal portion in engagement with said bearing means, and the surface of said wall being inclined outwardly and towards said resilient element so as to prevent the same from being flattened to the extent of dead center.

HAROLD J. COLES.

REFERENCES CITED

The following references are of record in the file of this patent:

UNITED STATES PATENTS

| Number | Name | Date |
| --- | --- | --- |
| 31,792 | Evans | Mar. 26, 1861 |
| 37,283 | Evans | Jan. 6, 1863 |
| 1,946,684 | Gairing | Feb. 13, 1934 |
| 1,993,809 | Schnelle | Mar. 12, 1935 |